United States Patent

Higgins

[15] 3,704,653
[45] Dec. 5, 1972

[54] SPRING-FORCE APPLYING MEANS

[72] Inventor: Horatio Leslie Higgins, London, England

[73] Assignee: Westinghouse Brake and Signal Company Limited, London, England

[22] Filed: March 11, 1971

[21] Appl. No.: 123,271

[30] Foreign Application Priority Data

May 21, 1970  Great Britain..........24,630/70

[52] U.S. Cl....................................92/29, 188/170
[51] Int. Cl................................................F01b 9/00
[58] Field of Search...............192/91, 91 A, 70.27, 94, 85 CA; 92/3, 29, 24; 188/170

[56] References Cited

UNITED STATES PATENTS 2,722,301  11/1955  Francois...................192/94 X
3,145,816  8/1964  DeLorgan et al........192/91 A
3,464,528  9/1969  Mork et al. ...............192/91 R
3,540,557  11/1970  Hasselbacher...........192/91 A

FOREIGN PATENTS OR APPLICATIONS 765,330  12/1933  France......................192/91 A
46,443  7/1939  Netherlands................192/85

Primary Examiner—Martin P. Schwadron
Assistant Examiner—R. H. Lazarus
Attorney—Larson, Taylor & Hinds

[57] ABSTRACT

A spring-brake actuator wherein the piston acted upon by the spring is connected to its piston rod via a clutch held disengaged only so long as fluid pressure is effective on the piston to render the spring inoperative to apply the brake.

5 Claims, 3 Drawing Figures

PATENTED DEC 5 1972 3,704,653
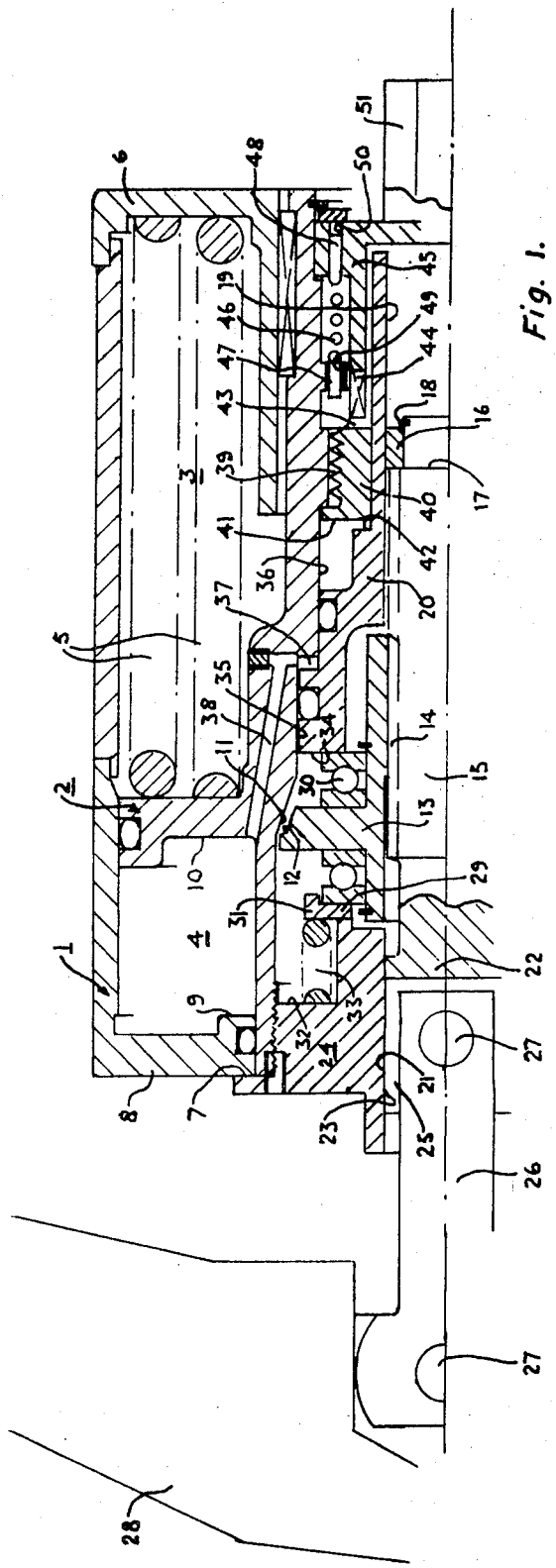
Fig. 1.
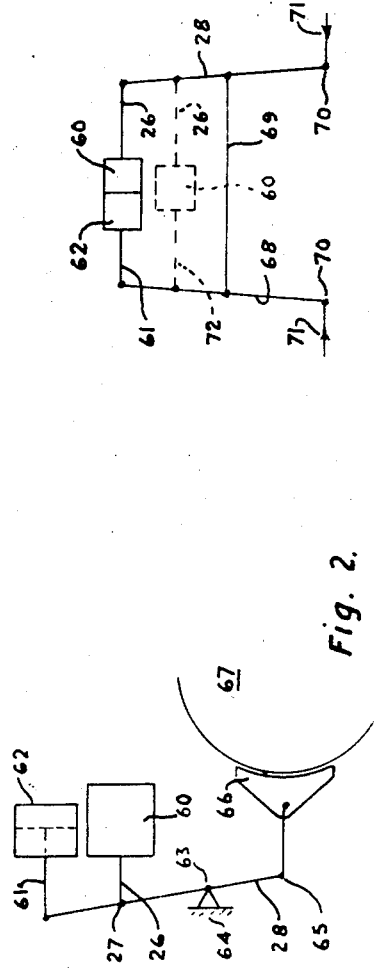
Fig. 2.
Fig. 3.

SPRING-FORCE APPLYING MEANS

This invention relates to spring-force applying means having a spring which exerts its force across a pair of members relative displacement of which in one direction under the influence of the spring causes the spring to apply a force on a force transmitting element, and a chamber defined at least in part by the pair of members to which chamber can be applied a fluid pressure which exerts across the members a force opposing that exerted by the spring whereby the members are relatively displaced in the opposite direction at least partially to relieve the element of the force otherwise applied thereto by the spring. Such spring-force applying means will hereinafter be referred to as "of the type described."

Spring-force applying means of the type described can be used as brake actuators for applying the brakes of either a road or a rail vehicle. In this case, the element is connected to a brake of the vehicle. Such brake actuators may be the sole form of brake-applying means or may be additional to the conventional fluid-pressure or electrically operated brake applying means as an emergency and/or brake applying means.

The present invention provides a spring-force applying means of the type described, wherein the force-transmitting element is operatively connected to one of the pair of members through a clutch engaged when the pressure in the chamber is below a pre-determined value thereby to permit (upon the relevant displacement of the members by the spring in said one direction) the spring to apply a force on the element, the clutch being disengaged upon the application of the fluid pressure to the chamber when that fluid pressure exceeds said predetermined value so that the element can move freely in either direction relative to said one of the members.

The clutch may be constituted by a nut threadedly engaged through a reversible thread with the element, the nut having a clutch face cooperable with a complementary clutch face on said one of the members. The nut may be urged by a second spring in a direction to engage the clutch faces, the value of the spring determining the predetermined value of pressure in the chamber at which the clutch is engaged or disengaged respectively. The nut, in operation of the means, may be moved against the force exerted by a second spring thereby to disengage the clutch by the fluid pressure in the chamber being applied to a pressure responsive member operative on the nut. There may be interposed between the nut and the second spring a first thrust bearing and between the nut and the pressure-responsive member a second thrust bearing; the bearings may each be a ball-bearing.

An embodiment of the present invention which is also described in commonly owned copending U.S. application Ser. No. 123,272, filed concurrently with this application, will now be described in greater detail, by way of example only, with reference to the accompanying drawings of which:

FIG. 1 is a cross-sectional view of the spring force applying means,

FIGS. 2 and 3 diagrammatically illustrate brake-applying means for a rail vehicle incorporating the spring-force applying means of FIG. 1.

Referring, firstly, to FIG. 1; the spring-force applying means (which, in this case, is a spring-brake actuator) comprises a pair of members 1 and 2 of which the member 1 is a fixed cylinder and the member 2 is a piston slidable within the cylinder. The piston 2 divides the cylinder 1 into two chambers 3 and 4.

Within the chamber 3 is a pair of heavy compression springs 5 one end of each of which abuts the piston 2 and the other end of each of which abuts the end wall 6 of the cylinder 1 so that the springs 5 exert across the members 1 and 2 a force tending to move the piston 2 to the left as viewed in the drawing. Opening into the chamber 4 is a port (not shown) by which fluid under pressure can be applied to the chamber 4.

The limits of the stroke of the piston 2 are determined (in the direction to the right as viewed in the drawing) by a stop-face 7 carried by the piston 2 engaging the end wall 8 of the cylinder 1 and (to the left as viewed in the drawing) by a stop-face 9 on the interior of the end wall 8 of the piston 1 engageable by the face 10 of the piston 2.

The piston 2 provides a first clutch face 11 engageable by a complementary cooperable clutch face 12 on a nut 13. The nut 13 is threadedly engaged through a reversible thread at 14 with a force-transmitting element 15. The element 15 is guided at its right-hand end (as viewed in the drawing) by a bush 16 located on the element 15 between a shoulder 17 and a circlip 18 (the bush 16 being slidable within a bore 19 in a pressure-responsive member 20) and, at its left-hand end (as viewed in the drawing) by the circumferential wall 20 of a rod-like extension 22 of the element 15 (the circumferential wall 21 being slidable within a bore 23 of a part 24 fixed to the piston). The rod-like extension 22 has extending across it a cut 25 from which projects a thrust member 26 pivotally mounted on the extension 22 by a pivot-pin 27. The outer end of the thrust member 26 is pivotally connected by a pivot-pin 27 with an arm 28.

Returning to the nut 13, there is located one on each side of the nut thrust bearings 29 and 30. The thrust bearing 29 is located between the nut 13 and an abutment 31 between which and an end face 32 of the part 24 is a compression spring 33. The thrust bearing 30 is located between the nut 13 and the end face 34 of the pressure-responsive member 20. The pressure-responsive member 20 is in the form of a piston slidable within bores 35 and 36 in the piston 2. Between the piston 20 and the piston 22 is a chamber 37 connected to the chamber 4 via a conduit 38.

Threadedly engaged at 39 with the piston 2 is a rotatable member 40 which has an end face 41 engageable with a face 42 on the piston 20. At the opposite end of the rotatable member 40 from the face 41 are dogs 43 interdigitated with dogs 44 on a further rotatable member 45 located within the piston 2. Extending between the piston 2 and the further rotatable member 45 is a torque spring 46 the tails 47 and 48 of which are engaged respectively in a hole 49 in the piston 2 and a hole 50 in the member 45. Projecting from the member 45 outwardly of the cylinder 1 is a box 51.

The above-described actuator operates as follows:

Assuming that the pressure in chamber 4 is at atmospheric pressure, the springs 5 will move the piston 2 to the left (as viewed in the drawing) and, because there will likewise be atmospheric pressure in the chamber 37, the spring 33 will, through the thrust bearing 29, spin the nut 13 along the element 15 to inter-engage the clutch faces 11 and 12. Thus, leftward movement of the piston 2 under the influence of the springs 5 will cause the force exerted by the springs 5 to be transmitted to the element 15 via the piston 2 and the nut 13. The element 15 will therefore also be moved to the left carrying with it the thrust member 26 to apply the force exerted by the springs 5 on the arm 28.

In order to relieve the arm 28 of the force exerted by the springs 5 through the force-transmitting element 15, fluid pressure is introduced into the chamber 4 through the port (not shown) and this pressure, when it has built-up to a sufficient value, will overcome the force exerted by the spring 5 to return to the right the piston, to its position as shown in the drawing. Meanwhile, the pressure applied to the chamber 4 will be transmitted to the chamber 37 through the conduit 38 to move the piston 20 to the left against the effort exerted by the spring 33 so that when the pressure in the chamber 37 exceeds a predetermined value (determined by the value of the spring 33) the clutch faces 11 and 12 will be disengaged so as to free the arm 28 of the force exerted thereon by the springs 5.

As, conventionally, the arm 28 will have operative on it a return-spring (not shown), the arm 28 and the force transmitting element 15 will return to the right with the piston 2.

With the force on the arm 28 relieved, as above described, by the pressurization of the chamber 4, the chamber 37 will also be pressurized as above described. With the pressurization of the chamber 37, the spring 33 is overcome so that the clutch faces 11 and 12 are disengaged and the nut 13 is supported between the thrust bearings 29 and 30. In this condition, the arm 28 can freely be moved as the force-transmitting element 15 can move axially with the nut 13 spinning idly on the bearings 29 and 30.

If it is necessary manually to release the brakes operated by the actuator at any time (for example, for the purpose of renewing the brake blocks), this is achieved in the following manner:

Firstly, the chamber 4 (and therefore, the chambers 37) are de-pressurized so that the brakes will be applied in the manner above-described by the springs 5. By the use of a spanner applied to the hex 51, the member 45 can be rotated against the effort of the torque spring 46 so as similarly to rotate the member 40 through the interdigitated dogs 43 and 44. By virtue of the threaded connection at 39 of the member 40 with the piston 2, such rotation of the member 40 will cause member 40 to move to the left so that the face 41 of the member 40 engages the face 42 of the piston 20. Further rotation of the member 45 (and therefore, the member 40) will move the piston 20 to the left against the effort of the spring 33 and thus disengage the clutch faces 11 and 12. Such disengagement of the clutch faces 11 and 12 will free the piston 2 from being clutched to the force-transmitting element 15 and this produces two results. Firstly, the piston 2 will continue its movement to the left under the influence of the springs 5 until the face 10 of the piston 2 abuts the stop face 9 on the interior of the end face 8 of the cylinder 1 and, secondly, the conventional return spring operative on the arm 28 will move that arm and the force-transmitting element 15 to the right (as viewed in the drawing) while the nut 13 spins freely on the thrust bearings 29 and 30 as the clutch faces 11 and 12 are now disengaged. Thus, although the piston 2 is what would normally be its brake-applying position, the brakes will, in fact, be released by the return-spring (not shown) normally operative on the arm 28.

As soon as the member 45 is allowed to return (under the influence of the torque spring 46) to its original position upon the removal of the spanner from the hex 51, the member 40 will be rotated with the member 45 by the torque spring 46 back to its original position in which the faces 41 and 42 are disengaged thus allowing the spring 33 to re-engage the clutch faces 11 and 12. After replacement of the brake blocks, the system is restored to its normal mode of operation by re-pressurization of the chambers 4 and 37.

The above-described actuator can be applied in conventional rail vehicle braking systems as illustrated in FIGS. 2 and 3.

In the system of FIG. 2, the actuator above described is diagrammatically represented by the box 60 from which projects the thrust member 26 pivotally connected at 27 to the arm 28. Pivotally connected to the upper end (as viewed in the drawing) of the arm 28 is the piston rod 61 of a conventional air-applied brake actuator 62. The arm 28 is pivotally connected at 63 to a fixed mounting 64 and the lower end (as viewed in the drawing) of the arm 28 is pivotally connected at 65 to the conventional brake shoe 66.

In a normal service application, the brakes would be applied by the conventional air-applied brake actuator 62 application of air pressure to which would extend the piston rod 61 from the actuator 62 to pivot the arm 28 about the pivot 63 is an anti-clockwise direction to apply the brake shoe 66 to the wheel 67. Considering the brake actuator 60, in such a normal service application the chamber 4 and chamber 37 would be pressurized so that, firstly, the springs 5 were held compressed with the piston 2 in its position as shown in FIG. 1 and the spring 33 compressed by the application of the fluid pressure to the chamber 37 moving the piston 20 to the left (as viewed in FIG. 1) thus disengaging the clutch faces 11 and 12. Hence, as the arm 28 pivots in its anti-clockwise direction the thrust-transmitting element 15 will be free to move to the left (as viewed in FIG. 1) idly spinning the nut 13. Conversely, as the brakes are released by de-pressurization of the actuator 62 and the conventional return spring (not shown) returns the arm 28 in a clockwise direction about the pivot 63, the force-transmitting element 15 can be drawn to the left through the nut 13 which again will idly spin as the clutch faces 11 and 12 continue to be held disengaged by the application of fluid pressure to the chamber 37.

Should there be a failure or loss of pressure of or in the actuator 62, the brakes can be applied by reducing or removing entirely the pressure from chamber 4. If the pressure in chamber 4 is only partially removed this can be removed in a controlled manner so as gradually to apply the brakes. This will occur by virtue of the fact that with increasing reduction of the pressure in the chamber 4, the springs 5 will exert an increasing effective pressure on the piston 2 moving it to the left thus re-engaging the clutch faces 11 and 12 and applying the braking force through the piston 2, the nut 13, the force-transmitting element 15, the thrust member 26, and the arm 28 if, of course, the chamber 4 (and therefore, the chamber 37) is completely de-pressurized, the springs 5 will exert their full effect to exert maximum braking effort.

Additionally, the actuator 60 can be used as a parking brake for when the rail vehicle is parked, all systems will be de-pressurized so that again, the springs 5 will be full effective to exert the braking effort.

FIG. 3 shows an alternative arrangement to that of FIG. 2. In FIG. 3 two further alternatives are shown. That shown in full lines shows an arrangement with the conventional brake actuator 62 back-to-back with the actuator of FIG. 1. In this case, the thrust member 26 of the actuator 60 is connected to the arm 28 as previously described but the piston rod 61 of the conventional actuator 62 is connected to a second arm; the two arms 28 and 68 being interconnected with a tie bar 69 and each being pivotally connected at its lower end (as shown in the drawing) at 70 at the brake rigging 71 of conventional configuration.

Instead of the back-to-back arrangement shown in full lines, the actuator 60 may be (as shown in dotted lines) arranged in parallel with the conventional actuator 62. Again as is conventional, while the piston rod 61 of the conventional brake actuator 62 would be connected to the arm 68, the cylinder of the actuator 62 would be connected to the upper end (as shown in the drawing) of the arm 28. As regards the actuator 60, the thrust member 26 would again be pivotally connected to the arm 28 but the cylinder 1 of the actuator 60 would be connected by a bar 72 to the arm 68.

The operation of the system shown in FIG. 3 will be clear to those skilled in the art from the description which has been given above with respect to the arrangement shown in FIG. 2.

By virtue of the pressure in chamber 37 being released through conduit 38 and chamber 4, there may be delay in release of pressure from chamber 37 relative to release of pressure from chamber 4. Should this be so, then there might result some extension (albeit minimal) of spring 5 prior to inter-engagement of clutch faces 11 and 12. If such be objectionable, then the supply and withdrawal of pressure to and from shoulders 4 and 37 could be effected from a point in conduit 38 with a choke being positioned in the conduit 38 between that point and the chamber 4 thus to delay the release of pressure in chamber 4 relative to release of pressure in chamber 37.

Having thus described my invention what I claim is:

1. A spring force applying means comprising a pair of members relative displacement of which in one direction under the influence of a spring causes the spring to apply a force on a force transmitting element and a chamber defined at least in part by the said pair of members to which chamber can be applied a fluid pressure which exerts across the members a force opposing that exerted by the spring to displace the members relatively in the opposite direction to at least partially relieve said force transmitting element of the force otherwise applied thereto by the spring, and wherein the force transmitting element is operatively connected to one of the pair of members through a clutch which engages when the pressure in the chamber is below a predetermined value to cause the spring thereof to apply a force on the element upon the relevant displacement of the members by the spring in said one direction, the clutch being disengaged upon the application of fluid pressure to the chamber when that fluid pressure exceeds said predetermined value, the engagement of said clutch and said force transmitting element including for allowing the said force transmitting element to move freely relative to said clutch when the clutch is disengaged.

2. A spring-force applying means as claimed in claim 1, wherein the clutch is constituted by a nut threadedly engaged through a reversible thread with the element, the nut having a clutch face cooperable with a complementary clutch face on said one of the members.

3. Spring-force applying means as claimed in claim 2, wherein the nut is urged by a second spring in a direction to engage the clutch faces, the value of the spring determining the pre-determined value of pressure in the chamber at which the clutch is engaged or disengaged respectively.

4. Spring-force applying means as claimed in claim 3, wherein the nut, in operation of the means, is moved against the force exerted by a second spring thereby to disengage the clutch by the fluid pressure in the chamber being applied to a pressure responsive member operative on the nut.

5. Spring-force applying means as claimed in claim 4, wherein there is interposed between the nut and second spring a first thrust bearing and between the nut and the pressure responsive member a second thrust bearing.

* * * * *